United States Patent
Kurahashi et al.

(10) Patent No.: US 8,978,248 B2
(45) Date of Patent: Mar. 17, 2015

(54) METHOD OF MANUFACTURING A VALVE FOR AN INTERNAL COMBUSTION ENGINE

(75) Inventors: Kazunori Kurahashi, Hadano (JP); Maiku Mikami, Hadano (JP)

(73) Assignee: Nittan Valve Co., Ltd., Hadano-shi (JP)

( * ) Notice: Subject to any disclaimer, the term of this patent is extended or adjusted under 35 U.S.C. 154(b) by 0 days.

(21) Appl. No.: 14/348,692

(22) PCT Filed: Oct. 14, 2011

(86) PCT No.: PCT/JP2011/073651
§ 371 (c)(1),
(2), (4) Date: Jul. 30, 2014

(87) PCT Pub. No.: WO2013/054436
PCT Pub. Date: Apr. 18, 2013

(65) Prior Publication Data
US 2015/0000130 A1    Jan. 1, 2015

(51) Int. Cl.
*B21K 1/22* (2006.01)
*B23P 15/00* (2006.01)

(52) U.S. Cl.
CPC .................................... *B23P 15/002* (2013.01)
USPC .................. 29/888.451; 29/888.45; 29/888.4; 72/68

(58) Field of Classification Search
CPC .......... B23P 15/002; B21K 1/20; B21K 1/22; B21K 1/24; F02D 9/107
USPC ............... 29/888.4, 888.451, 888.45, 890.12; 72/68, 69, 80, 94, 102, 105
See application file for complete search history.

(56) References Cited

U.S. PATENT DOCUMENTS 6,295,731 B1 * 10/2001 Yamakawa et al. .......... 29/888.4

FOREIGN PATENT DOCUMENTS

| JP | 8-61028 A | 3/1996 |
| JP | 2001-115808 A | 4/2001 |
| JP | 2001-121239 A | 5/2001 |
| JP | 2002-160038 A | 6/2002 |
| WO | 2011/058793 A1 | 5/2011 |

OTHER PUBLICATIONS

International Search Report dated Jan. 17, 2012, issued in corresponding application No. PCT/JP2011/073651.

* cited by examiner

*Primary Examiner* — Sarang Afzali
(74) *Attorney, Agent, or Firm* — Westermann, Hattori, Daniels & Adrian, LLP

(57) ABSTRACT

A method of manufacturing a valve (10) is provided, in which an intermediate valve product having a generally disk-shape valve head is formed by a die unit (20). The valve head is then machined to have a proper thickness and a tapered face on the periphery of the disk-shape valve head. The valve head is repeatedly forged in secondary forging by means of a die unit (40) equipped with a die (42) and a press punch (48) while angularly displacing the tapered face relative to the die (42) through a predetermined angle. Since the die (42) has protruding pressing sections and grooves (46) along the circumference of the die, a uniformly deformed and hardened valve face (16) is formed on the valve head.

4 Claims, 13 Drawing Sheets

Vicker's hardness and test conditions

| Test Load | 98.1 [N] |
|---|---|
| Retention Time | 15 [S] |
| Indenter | Regular Quadrangular Pyramid, with angle between opposing faces being 136° |
| Measuring Points | Measured at intermediate point, a point 1 mm radially inward from the outer periphery, and a point 1 mm radially outward from the inner periphery, at depths of 0.5, 1.0, 1.5, 2.0, 3.0, 4.0, and 5.0 mm from the surface. |

(HV)

METHOD OF MANUFACTURING A VALVE FOR AN INTERNAL COMBUSTION ENGINE

TECHNICAL FIELD OF THE INVENTION

This invention relates to a method of manufacturing a valve for an internal combustion engine, and more particularly to a method of manufacturing a valve having an enhanced hardness in a face of a valve head (the face will be hereinafter referred to as valve face) of the valve by forging the valve material in such a way that slip deformations are created in the valve face.

BACKGROUND ART

The valve face of an air intake/exhaust valve of an internal combustion engine is required to have a high wear resistance and a hot corrosion resistance, since it comes into contact with a valve seat to open/close the combustion chamber of the engine. Thus, there have been made many proposals to improve wear resistance and hot corrosion resistance of valves, involving provision of appropriate forging temperatures and a forging rate. However, any of the past proposals fails to provide the valve face with sufficient hardness and fails to prevent deposition of combustion residues and generation of impressions in the valve face, which lowers a blow-through characteristic of the valve face. This is the case particularly with valves for diesel engines that use a low grade fuel.

A patent document 1 listed below discloses a measure for solving this problem.

This prior art forging method utilizes a Ni-type precipitation hardened alloy as the valve face material, which is forged in the temperature range from 20 to 500° C. so as to create radial slip deformations in the valve face.

Consequently, the valve face is hardened to an extent that the valve face is scarcely impressed with combustion residues and wear resistance is greatly improved. In addition, this method can provide the valve with harder deep layers near the periphery of the valve than shallow layers inside the periphery, thereby greatly prolonging the life of the valve.

PRIOR ART DOCUMENTS

Patent Document

Patent Document 1: JPA Laid Open H8-61028 (Paragraphs 0007, 0012, 0014-0018, and 0029, FIGS. 1 and 5)

SUMMARY OF THE INVENTION

Objects to be Achieved by the Invention

In order to comply with recent severe exhaust gas regulations, some engine have been improved to withstand a high combustion pressure for example, which in turn demands a valve to have a valve head having a highly wear-resisting and hot-corrosion-resisting valve face. However, in spite the need of such valve head, a prior art method disclosed in the patent document 1 can provide only a limited solution for an anti-wear and anti-hot corrosion problem.

Conventionally, the valve face that comes into contact with a valve seat of an internal combustion engine is formed with a die unit equipped with a die 1 having a pressing protrusion 2 that bulges radially inward and a punch 4 for pressing the front end of the valve head of an intermediate valve product W inserted in the die 1, as shown in FIG. 14. The present inventors have found in deliberate examinations of valves formed in this way that the pressure (force per unit area) of the die can be applied only to a limited layer of a material in a process of plastic deformation, failing to provide deep deforming to the material, due to the fact that the entire tapered pressing face 2a of the pressing protrusion 2 is pressed against the material, so that only a surface region of the material is hardened.

The present inventors then found that, if the die 1 is formed with a multiplicity of radial grooves formed to cross the pressing protrusion 2, the total area of the pressing protrusion 2 is reduced, thereby effectively increasing the pressure that acts on the material and promoting plastic deformations and hardening the material to a desired depth.

In this case, the material pressed in this way will have deformed and non-deformed portions alternately along the circumference of the die 1, since the die 1 has a multiplicity of interleaving pressing sections and grooves. However, by forging an intermediate valve product in conjunction with punching while rotating either the intermediate valve product or the die through a predetermined angle about the axis thereof, plastic deformation of the intermedidate valve product is uniformized over the entire region to be forged.

In a series of forging tests the effectiveness of a prototype die unit having a sequence of alternating protruding pressing sections and grooves along the circumference of the die for forging a valve head has been verified to effectively harden not only a shallow region but also a deep region of the valve head, as shown in FIGS. 10 through 13.

Thus, in view of the prior art problem mentioned above, it is an object of this invention to provide a method of manufacturing valves for internal combustion engines, having sufficient hardness, wear resistance, and blow-through characteristic.

Means of Achieving the Object

To achieve the object above, there is provided in accordance with the invention as recited in claim 1, a method of manufacturing a valve for an internal combustion engine, adapted to form a valve face of the valve that comes into contact with a valve seat of the internal combustion engine, by creating radial slip deformations in the valve face of the intermediate valve product made of a heat resisting alloy, utilizing a die unit having;

a die equipped with pressing protrusions, arranged inside and along the circumference thereof, for forming the valve face, and a punch for pressing the front end of a valve head of the intermediate valve product, the method characterized by utilizing the die wherein the die is provided with a multiplicity of grooves spaced apart from each other at equal angular intervals in the circumfrential direction thereof, each groove crossing an associated one of the pressing protrusions; and wherein the intermediate valve product and the die unit are rotated relative to each other through a predetermined angle in synchronism with the punch in operation.

(Function) The pressing protrusions are provided to form a valve face of a valve that comes into contact with a valve seat of the engine, which are crossed by a multiplicity of radial grooves running at equal angular intervals. Hence, the die has fan-shaped pressing faces for forming the valve face of a valve and fan-shaped grooves (as seen in plan view) alternating along the circumference of the die.

Consequently, the total area of these pressing protrusions for creating slip deformations in the valve face of the intermediate valve product is significantly less than the area of a conventional annular pressing protrusion formed on a die unit for secondary forging, so that the force per unit area applied by the die to the intermdeiate valve product is larger than the conventional annular area. Thus, the plastic deformation created in the valve material in one punch by the inventive die is larger than that created by a conventional die, thereby hardening deep layers of the valve face.

Further, since the intermediate valve product and the die unit are rotated relative to each other through a predetermined angle (60 degrees for example) for every punching operation, a punched area of the valve head is shifted every time by the same angle in the circumferential direction (60 degrees for example). Thus, by rotating the intermediate valve product, for example, through an angle in the range from 270-360 degrees (¾-1 revolution) in sequence during punching, the valve face is eventually evenly deformed (forged).

It is noted that the predetermined angle of the relative rotation of the intermediate valve product and the die unit for each punching operation may depend on the circumferential length of each pressing protrusion (or the central angle subtended by the pressing protrusion about the center of the die). Preferably, the angle is such that at least the area pressed in one punching operation partly overlaps the previously punched area in the circumferential direction.

In the method of claim 1, the intermediate valve product may be pushed at one end of a valve stem thereof with an ejector pin so as to retain the valve head of the intermediate valve product off the pressing protrusions of the die when the punch is raised to a predetermined upward position above the die, as recited in claim 2.

(Function) To rotate the intermediate valve product relative to the die unit, the die unit (or die) may be rotated relative to the intermediate valve product, or alternatively, the intermediate valve product may be rotated relative to the die unit. In the former approach, a large and heavy die unit facility must be rotated, but in the latter approach an operator only needs to rotate a light compact intermediate valve product.

In the method as recited in claim 1 or 2, a generally diskshape valve head is formed at one end of a rod material, and a predetermined tapered face that corresponds to a valve face of the valve head is formed on the periphery of the disk-shape valve head simultaneously by primary forging. After an excessively thick portion of the disk-shape valve head is adjusted by maching, the disk-shape valve head may be further subjected to secondary forging, as recited in claim 3.

(Function) Such primary forging provides the disk-shape valve head of an intermediate valve product with fine grain flow lines, which contribute to the hardening of the tapered face associated with a valve face of the valve. The tapered face is formed on the periphery of the disk-shape valve head. The subsequent secondary forging further enhances growth of the grain flow lines in the valve face, thereby further hardening the valve face.

More particularly, this valve manufacturing method comprises:

a primary step of forging, in which a generally disk-shape valve head is formed at one end of a rod material, and a predetermined tapered face that corresponds to a valve face of the valve head is formed on the periphery of the disk-shape valve head simultaneously;

a step of adjusting the thickness of the disk-shape valve head by machining an excessively thick portion of the diskshape valve head; and a secondary step of forging, subsequent to the step of adjusting the thickness, in which the disk-shape valve head is subjected to secondary forging.

It is noted that a tapered face that corresponds to a valve face of the valve is formed on the periphery of the disk-shape valve head in the primary step in preparation for the next secondary step to create slip deformations in the valve face. That is, in this approach, unlike a comventional approach where such tapered face is formed in a thickness adjustment step, a tapered face is formed in the primary step to eliminate the need of machining the thick portion of an intermediate valve product. Consequently, an intermediate valve product requires machining of only a thick portion of the front end of the valve head in the thickness adjustment step.

It is also noted that a hard surface layer having dense grain flow lines is exposed on the valve face of the intermediate valve product prior to the secondary step of forging and that the grain flow lines will be further grown in the surface layer in the secondary forging, thereby further hardening the valve face.

Results of the Invention

As would be clear from the foregoing description, according to the inventive method of manufacturing a valve for use with an internal combustion engine, a plastic deformation created in the punch operation is very large, reaching deep layers of the valve material, so that the entire valve face a valve head is highly hardened accordingly. Thus, the invention can provide an engine valve whose face portion has a high impression resistance and increased blow-through property.

The invention enables use of a conventional valve manufacturing facility as a means of deeply hardening the valve face of the valve head of a valve by simply replacing a conventional die unit with an inventive secondary forging die unit. Thus, the invention can provide at low cost a superb valve for an internal combustion engine having an excellent blow-through property and enhanced wear resistance.

According to the method as recited in claim 2, the rotational angle of an intermediate valve product relative to the die unit can be manually changed by a worker, so that no apparatus for rotating the die unit is needed. Thus, the die unit can be of simple structure.

According to the method as recited in claim 3, the hardness of the valve face of the valve head of a valve can be further hardened to improve both the blow-through property and wear resistance of the valve face.

BRIEF DESCRIPTION OF DRAWINGS

FIG. 2(*a*) shows a step of upsetting a valve. FIG. 2(*b*) a step of hot forging (primary forging) of a valve head of the valve; FIG. 2(*c*) a step of adjusting the thickness of a thick valve head; FIG. 2(*d*) a step of re-forging the valve head; FIG. 2(*e*) a step of final machining of the surface of the valve head; and FIG. 2(*f*) a step of polishing the surface of the valve head.

FIG. 3(*b*) after the thickness adjustment; and FIG. 3(*c*) after the secondary forging.

FIG. 4(b) shows grain flow lines formed in a valve head subjected to the primary forging step. FIG. 4(c) shows grain flow lines formed in a valve head in the secondary forging step.

FIG. 10(a) is a table listing the results of the measurements of valves manufactured by the inventive method 1; FIG. 10(b) is a table listing the results of the measurements of valves manufactured by the comparative method 1, and FIG. 10(c) is a graphical representation of the results shown in FIGS. 10(a) and (b).

FIG. 11(a) is a table listing the results of the measurements of valves manufactured by the inventive method 1; FIG. 11(b) is a table listing the results of the measurements of valves manufactured by the comparative method 1, and FIG. 11(c) is a graphical representation of the results shown in FIGS. 11(a) and (b).

FIG. 12(a) is a table listing the results of the hardness measurements of the valve faces of valves (having a valve head diameter of 70 mm) manufactured by an inventive method 3. FIG. 12(b) is a graphical representation of the results shown in FIG. 12(a).

BEST MODE FOR CARRYING OUT THE INVENTION

The invention will now be described in detail by way of example with reference to the accompanying drawings.

Figure 1:
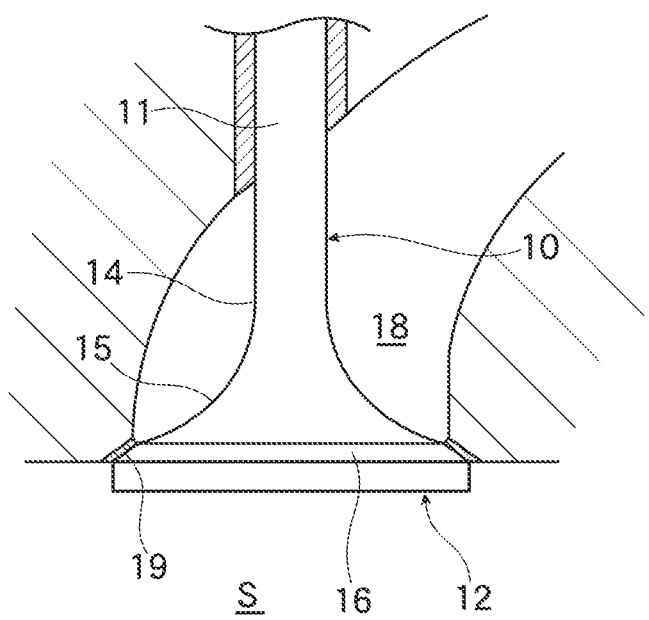
FIG. 1 is a side elevational view of a poppet valve for use with an internal combustion engine, manufactured in accordance with the invention.

In FIG. 1, reference numeral 10 indicates a poppet valve for an internal combustion engine, manufactured by an inventive method. The poppet valve 10, made of a heat resisting metal such as a precipitation-hardened type Ni-based alloy (NCF80A or NCF751 for example), has a valve head 12 connected to the leading end of the valve stem 11 across a valve neck 14 and a valve fillet 15. Formed on the back side of the valve head 12 is a valve face 16 that is contiguous with the valve fillet 15 and comes into contact with a valve seat 19 formed on the periphery of an air exhaust port (or air intake port) 18 of the combustion chamber S.

Figure 2:
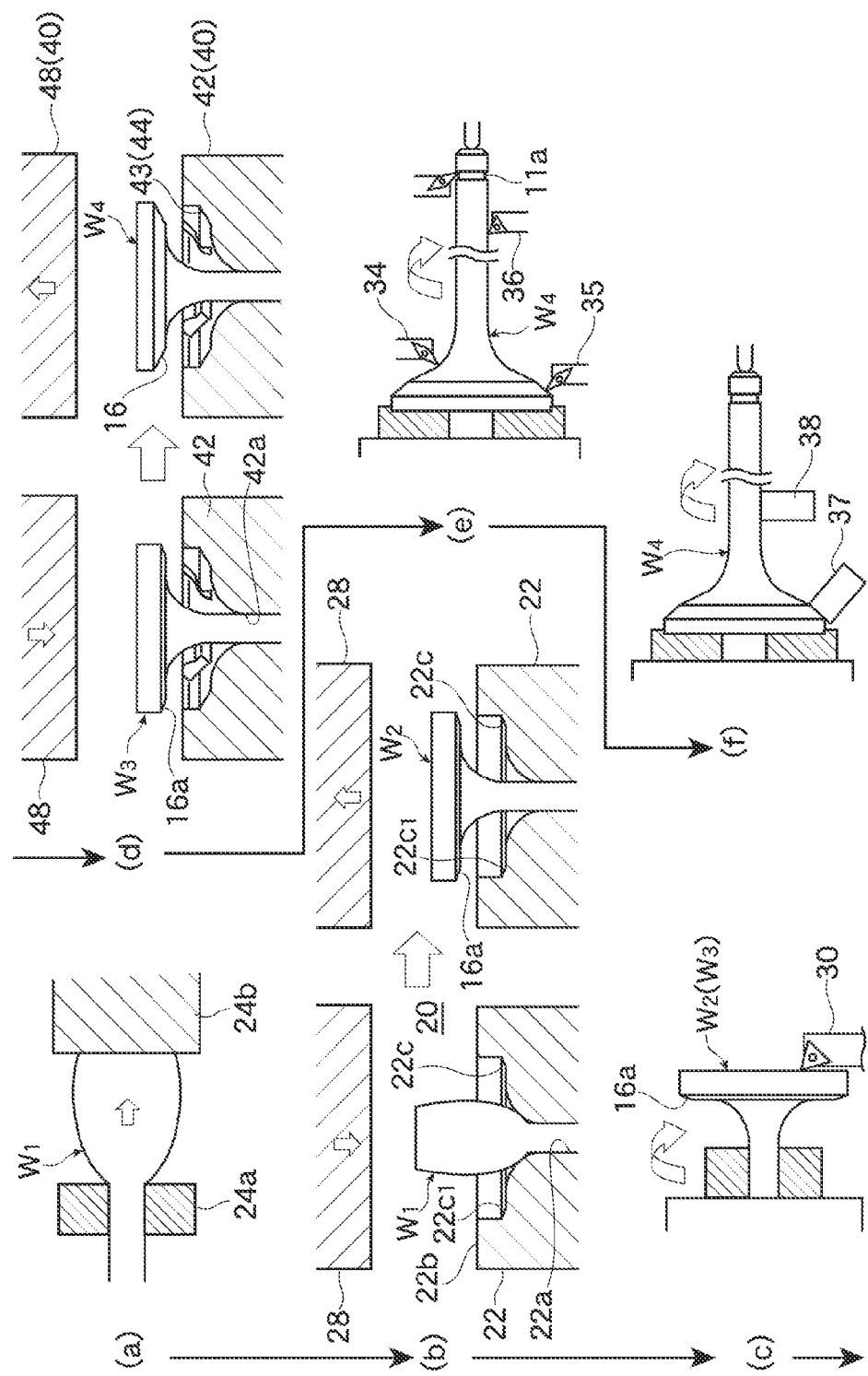
FIG. 2 illustrates the entire process of manufacturing a poppet valve according to the inventive method 1. More particularly, FIG. 1(*a*) shows a step of fixing a valve.

FIG. 2 shows an entire procedure of manufacturing the poppet valve 10 of FIG. 1 using the inventive method 1. It should be noted that the poppet valve 10 can be manufactured by simply applying the steps shown in FIG. 2(a) through FIG. 2(f) in sequence to a rod member of NCF80A (precipitation-hardened type Ni-base alloy).

Specifically, in a step of upset forging a valve, as shown in FIG. 2(a), an NCF80A rod member is heated by a pair of electrodes 24a and 24b (to about 1100° C. for example) impressed by a certain voltage and pressurized in its axial direction so as to form a bulge at the leading end of the valve stem, which bulge is then further heated in preparation for the next hot forging step to form a valve head. Symbol W1 indicates an intermediate valve product thus formed in the upset-forging.

Next, the upset intermediate valve product W1 is subjected to a hot forging (or primary forging) as shown in FIG. 2(b), in which the intermediate valve product W1 is set in a die unit 20 that consists of a die 22 having a predetermined pressing face 22c and a punch 28, and then a bulging valve head of the intermediate valve product W1 is forged into a predetermined disk-shape valve head, resulting in an intermediate valve product W2. The intermediate valve product W2 is then formed on the periphery of the disk-shape valve head with a tapered face 16a that corresponds to a valve face 16 of the valve 10.

Figure 3:
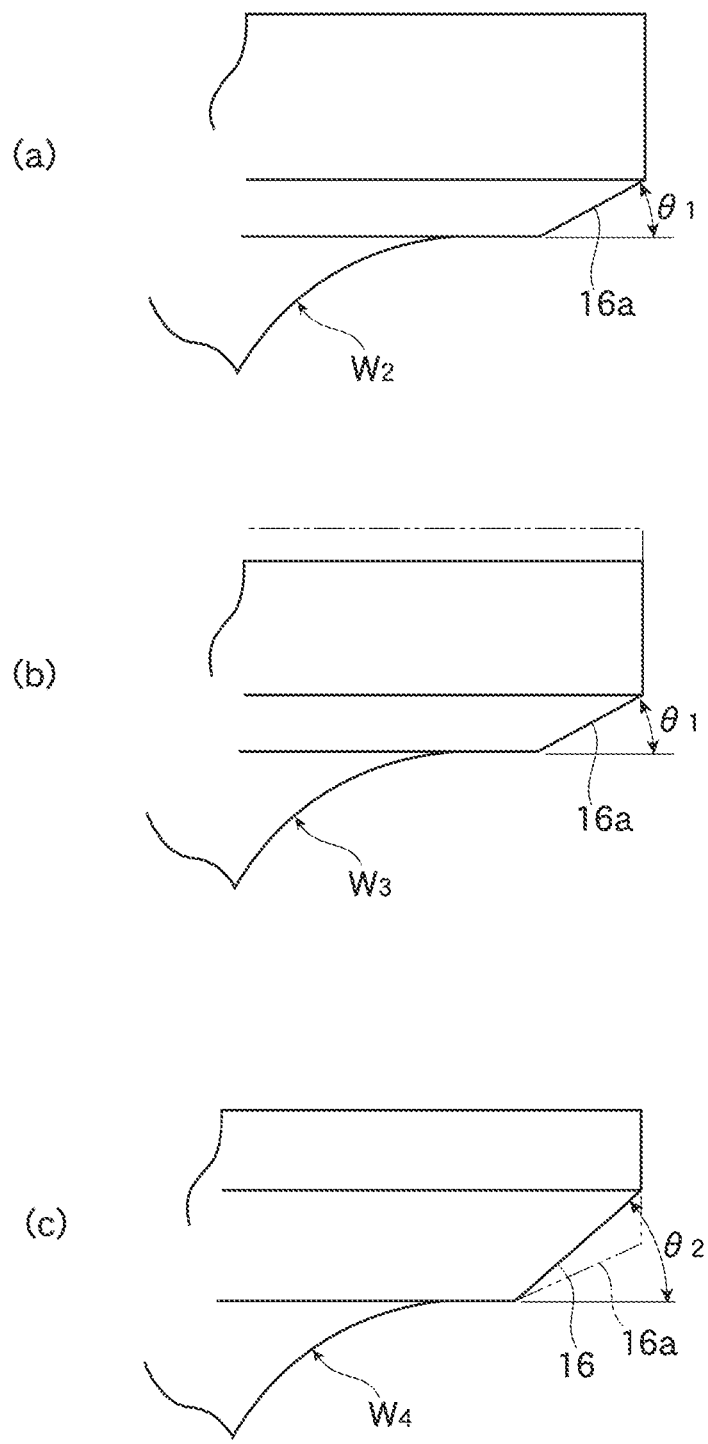
FIG. 3 shows in enlarged side elevational view the shape of the valve head of a valve manufactured by the first inventive method. More particularly, FIG. 3(*a*) shows the shape of a valve after the primary forging.

Next, in a thickness adjustment step shown in FIG. 2(c), the intermediate valve product W2 is retained in rotation while its outer peripheral surface and front end of the disk-shape valve head are machined with a cutting tool 30 to adjust the thickness of the valve head (in a manner as shown in FIG. 3(b)), resulting in a machined intermediate valve product W3. The double dotted line of FIG. 3(b) indicates the thick portion of the front end of the valve head to be cut by machining.

In the next secondary (re-forging) step shown in FIG. 2(d), the intermediate valve product W3 formed with the tapered face 16a is inserted in a die 42 of the die unit 40 having a predetermined pressing faces 44 and a pressing punch 48. The periphery of the intermediate valve product W3 is forged at a temperature in the range between 20 to 500° C. to form an intermediate valve product W4 having a valve face 16 on the valve head.

In the next machining step shown in FIG. 2(e), the intermediate valve product W4 is put in rotation while its valve face, curved valve neck R, valve stem 11, and cotter groove 11a are roughly machined using machining tools 34, 35, and 36. Finally, as shown in FIG. 2(f), the valve product W4 is machined with machining tools 37 and 38 while it is in rotation until the valve product W4 roughly cut n the form of a valve 10 as shown in FIG. 1.

Figure 4:
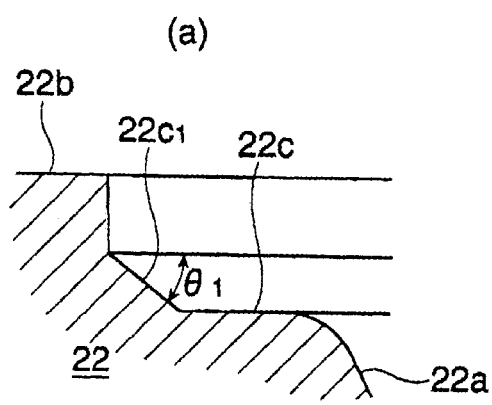
FIG. 4 (*a*) is an enlarged longitudinal cross section of a die unit adapted to form a valve head of a valve in the primary forging step.
Figure 4:
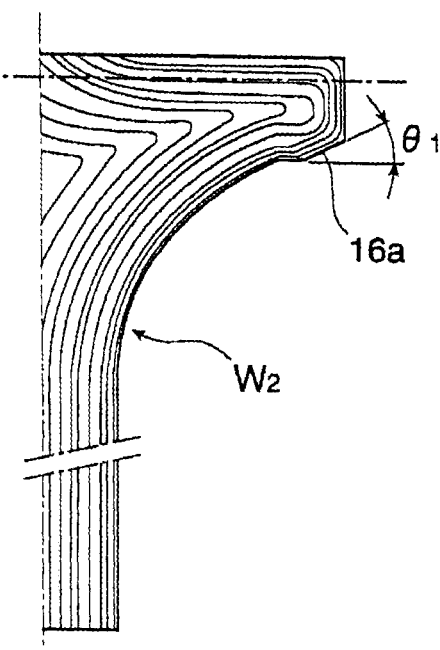
Figure 4:
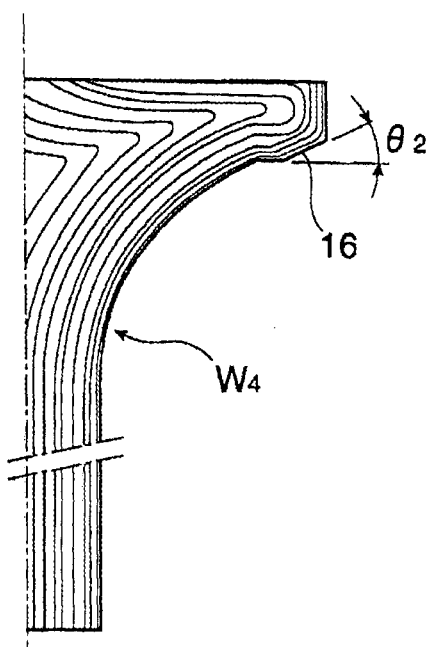

Referring to FIGS. 4(a) through 4(c), there is shown a die unit 20 (die 22) for use in the primary forging step shown in FIG. 2(b).

As shown in FIG. 2(b) and FIG. 4(a), the die 22 is provided at the center thereof with a hole 22a for passing therethrough a valve stem of an intermediate valve product W2, and a pressing face 22c for forming a disk-shape valve head of an intermediate valve product W2. The pressing face 22c has a through-hole which is contiguous with the through-hole 22a. The pressing face 22c has on the periphery thereof a taper forming face 22c1 for press forming a tapered face 16a that corresponds to the valve face 16 to be formed on the periphery of the valve 10.

The tapered face 16a is formed to efficiently and smoothly create radial slip deformations in the circumferential region of the valve face of the disk-shape valve head of the intermediate valve product W3 during a later stage of secondary forging (FIG. 2(d)). The angle of inclination θ1 of the tapered face 16a (and hence the angle of inclination of the taper forming face 22c1 of the die 22) is preferably slightly smaller (10 degrees for example) than the inclination angle θ2 (30 degrees for example) of the pressing faces 44 of pressing protrusions 43 formed on the secondary forging die unit 40 (die 42).

In the inventive method 1, since the peripheral region of the valve head of the intermediate valve product W2 is tapered in the primary forging step in preparation for secondary forging, only the front end of the valve head of the intermediate valve product W2 shown in FIG. 2(c) needs to be machined in a subsequent thickness adjustment process, as indicated by a phantom line in FIG. 3(c).

In other words, in a conventional valve manufacturing methods the tapered face 16a is formed on the periphery of the disk-shape valve head by machining the peripheral region thereof of an intermediate valve product in a thickness adjustment process subsequent to primary forging, thereby facilitating effective formation of smooth radial slip deformations in the peripheral region in secondary forging. In the present invention, however, the tapered face 16a is formed on the periphery of the disk-shape valve head of the intermediate valve product in the primary forging step, so that the resultant intermediate valve product only requires much shorter machining of a smaller and thinner region of the valve head in the subsequent thickness adjustment process shown in FIG. 2(c), thereby also saving valve material.

It is noted that a hard surface layer having dense grain flow lines as shown in FIG. 4(b) is now exposed on the peripheral tapered face 16a of the disk-shape valve head of the intermediate valve product W3 formed in the primary forging. Subsequently, by subjecting a region that includes the peripheral tapered face 16a to re-forging (or secondary forging) as shown in FIG. 2(d), the grain flow lines in the forged surface layer of the valve face 16 is further refined as shown in FIG. 4(c), rendering the face portion 16 still harder.

Referring to FIGS. 5 through 8, there is shown in detail a die unit 40 (die 42) for use in the secondary forging shown in FIG. 2(d).

Formed at the center of the die 42 is a vertical central hole 42a for passing through it the valve stem of an intermediate valve product W3. There are provided, in a skirt region 42c of the front end 42b of the die 42, three protruding pressng sections 43 for forming a valve head, which sections are spaced apart at equal angular intervals in the circumferential direction of the die 42. This configuration of this die unit is obtained by forming three radial grooves 46 in association with conventional circumferential pressing protrusion 2 inside the secondary forging die 1 (FIG. 15) such that each groove 46 crosses an associated circumferential pressing protrusion 2 (pressing face 2a). That is, seeing in plan view, fan-shaped pressing protrusions 43 (or pressing faces 44) for forming a valve face 16 and fan-shaped grooves 46 alternate along, and inside, the circumference of the die 42.

Figure 5:
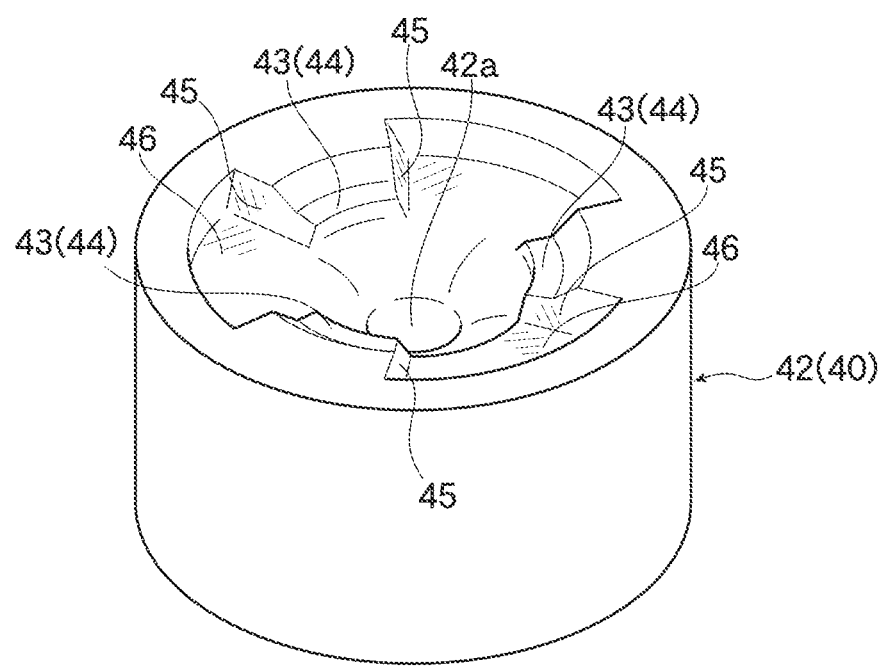
FIG. 5 is an perspective view of a die unit for use in the secondary forging step.
Figure 7:
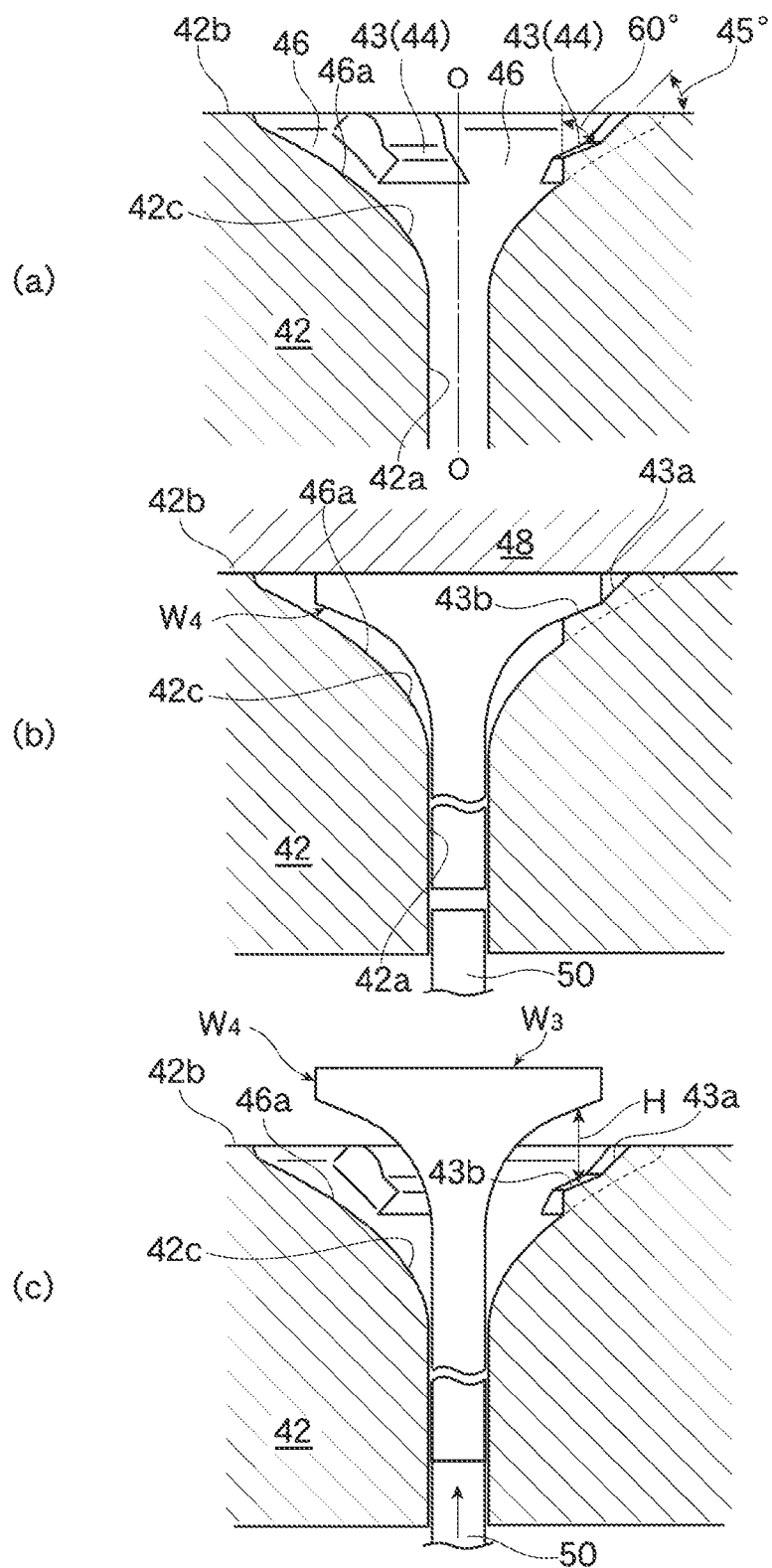
FIG. 7 shows longitudinal cross sections of the die taken along line VII-VII in FIG. 6, before it is subjected to the secondary forging of the valve head (FIG. 7(a)), after the secondary forging (FIG. 7(b)), and after the valve head is removed from the pressing section of the die (FIG. 7(c)).

As shown in FIGS. 5 and 7, each groove 46 has a bottom face 46a contiguous with a skirt region 42c, and each protrusion 43 erects from the skirt region 42c and the bottom face 46a to a predetermined height so as not to interfere with the valve head of the intermediate valve product W3 during forging the valve.

As shown in FIG. 7(a), each pressing protrusion 43 has a first tapered outer face 43a that is inclined radially inward (downward) towards the center O of the die at 45 degrees with respect to the front end 42b of the die 42, and a second tapered face 43b that is also inclined downward towards the center O, but less inclined than the first tapered face 43a by 15 degrees, and hence inclined at 30 degrees with respect to the front end 42b of the die 42. The second tapered face 43b serves as one of the pressing faces 44 of the die for pressing the valve face 16.

Figure 6:
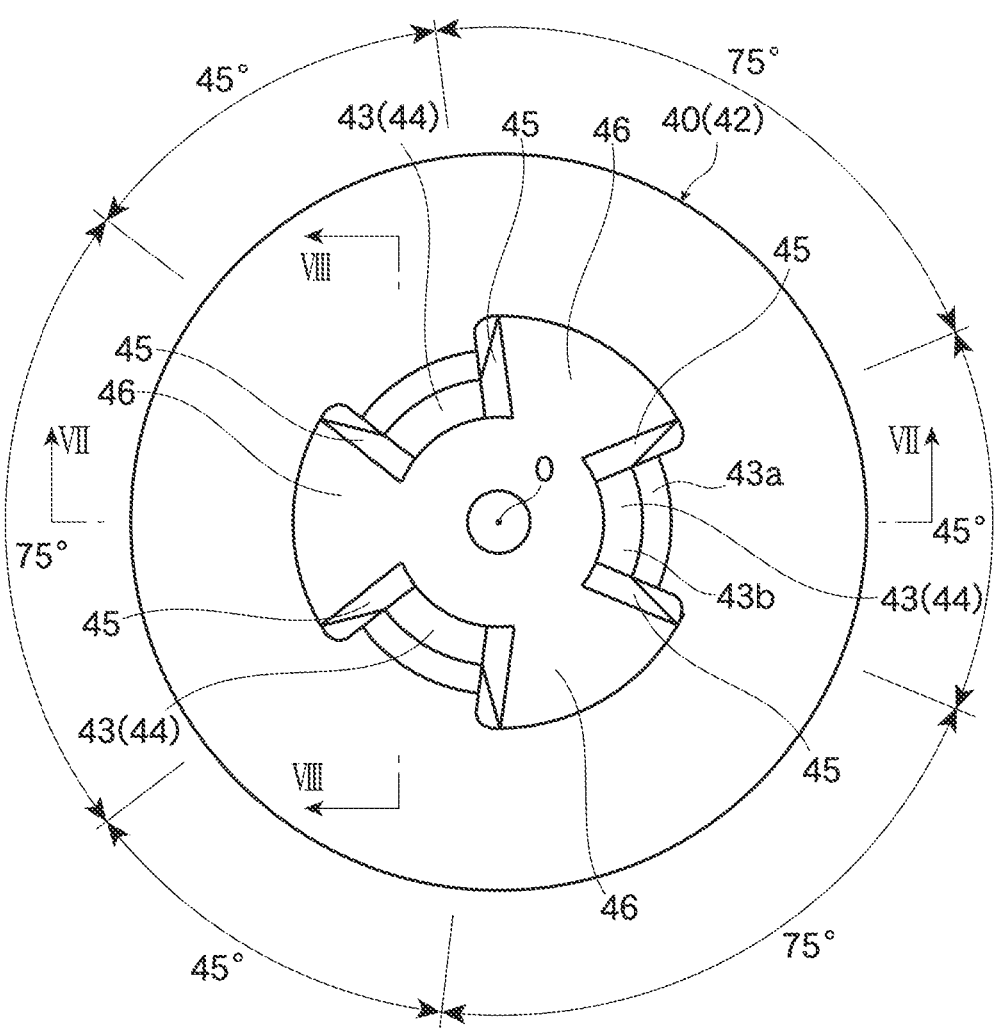
FIG. 6 is a plan view of pressing protrusions (or pressing face) of the die shown in FIG. 5.

As shown in the plan view of FIG. 6, each of the fan-shaped pressing faces 44 has a central angle of 45 degrees about the die center O. Each of the grooves 46 has a fan-shape in plan view, having a central angle of 75 degrees. The stepped surface 45 between the pressing faces 44(43b) of the pressing protrusion 43 and the bottoms face 46a of the groove 46 are inclined at 30 degrees with respect to a horizontal plane (60 degrees with respect to a vertical plane) as shown in FIG. 8.

Figure 8:
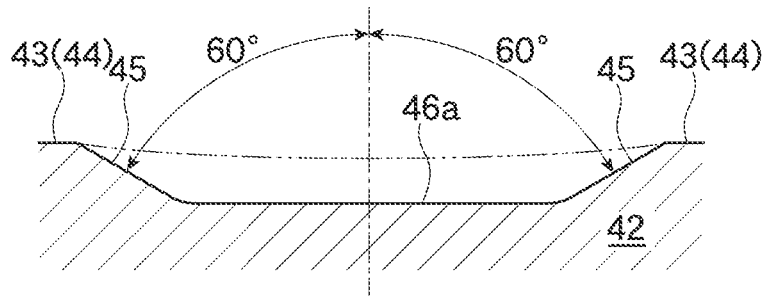
FIG. 8 shows a longitudinal cross section of the die taken along line VIII-VIII in FIG. 6.

It is noted that the angle of inclination of each stepped surface 45 is set to 30 degrees (60 degrees) with respect to the horizontal (vertical) plane as shown in FIG. 8 in order to efficiently deform the valve material and permit long use of the die unit 40 (die 42). If the angle of inclination of each stepped surface 45 with respect to the horizontal (vertical) plane is less than 25 degrees (65 degrees), the pressure applied by the pressing protrusions 43 to a material to be forged in the secondary forging step will be too small to deform deep layers of the material. On the other hand, if the angle is larger (less) than 45 degrees, the boundary regions between the pressing faces 44 (43b) of the respective pressing protrusions and the stepped surfaces 45 will suffer from serious wear, so that the protrusions cannot be used over a long period of time.

For this reason, the angle of inclination of the stepped surfaces 45 is preferably set in the range from 25 (65) to 45 (45) degrees, more preferably at 39 degrees, with respect to the horizontal (vertical) plane.

The die 42 is provided in the central hole 42a thereof with an ejector pin 50 for pushing upward the lower end of the intermediate valve product W4 inserted therein, as shown in FIG. 7(b).

The ejector pin 50 is used not only to push the intermediate valve product W4 out of the die after the secondary forging, but also used to hold the valve head of the intermediate valve product W4 at a predetermined offset position away from the pressing protrusions 43 in association with the upward movement of the pressing punch 48 subsequent to a press work with the punch 48, as shown in FIG. 7(c). As the operator manually rotates the valve head of the intermediate valve product W4 held in position above the 42 through a predetermined angle relative to the die unit 40 (die 42) before he lowers the ejector pin 50 to its home position, the pressing protrusions 43 are rotated through the same angle relative to the valve head of the intermediate valve product W4.

Since the die 42 has the pressing protrusions 43 and the fan-shaped grooves 46 alternately arranged along the circumference of the die 42, the valve head of the intermediate valve work W3 is deformed in some regions by the pressing punch 48 but not deformed in other regions. The deformed regions and non-deformed regions alternate each other in the circumferential direction of the valve. Thus, by rotating the valve head through a predetermined angle (60 degrees for example) with respect to the pressing protrusions 43 for five or six times to cover the entire valve face, it is possible to uniformly press the entire valve face of the intermediate valve product W3 with the pressing protrusions 43 in synchronism with the punch 48.

It is noted that the secondary forging utilizes the die unit 40 for pressing the valve face of the intermediate valve product W3 with the pressing protrusions 43 in collaboration with the pressing punch 48 that the peripheral tapered face 16a of the valve head is caused to be plastically deformed, accompanying slip deformations.

Figure 15:
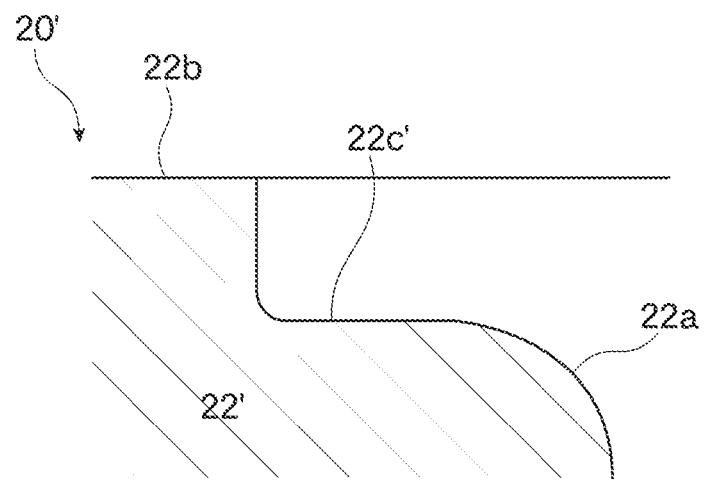
FIG. 15 shows a longitudinal cross section of a conventional die unit for use in primary forging.

It should be appreciated that the total area of the pressing protrusions 43 (pressing faces 44) for plastically deforming a region that includes the peripheral tapered face 16a of the disk-shape valve head is smaller than the total area of the pressing protrusion 2 (annular pressing face 2a of a predetermined width that correspond to the valve face) provided on the periphery of a conventional die 1 for secondary forging as shown in FIG. 15, so that the pressure applied to the material via the pressing protrusions 43 (pressing faces 44) is larger accordingly. As a result, the plastic deformations created in deep layers of the valve face 16 created by the pressing punch 48 are larger than those obtained by the conventional die 1.

Figure 10:
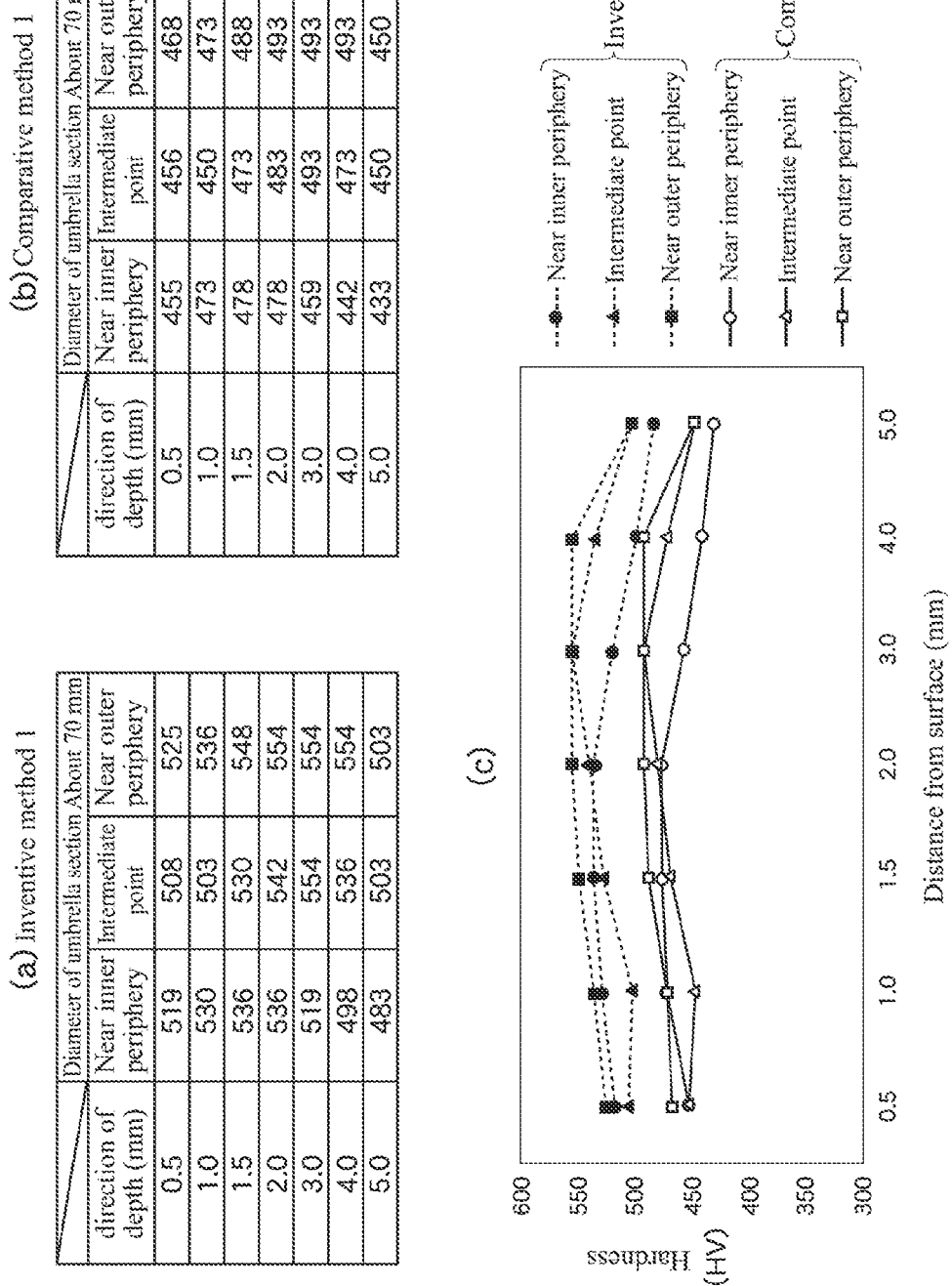
FIG. 10 compares the results of hardness measurements of different valves having a valve head diameter of 70 mm, manufactured by an inventive method 1 and by a comparative method 1. More particularly.
Figure 11:
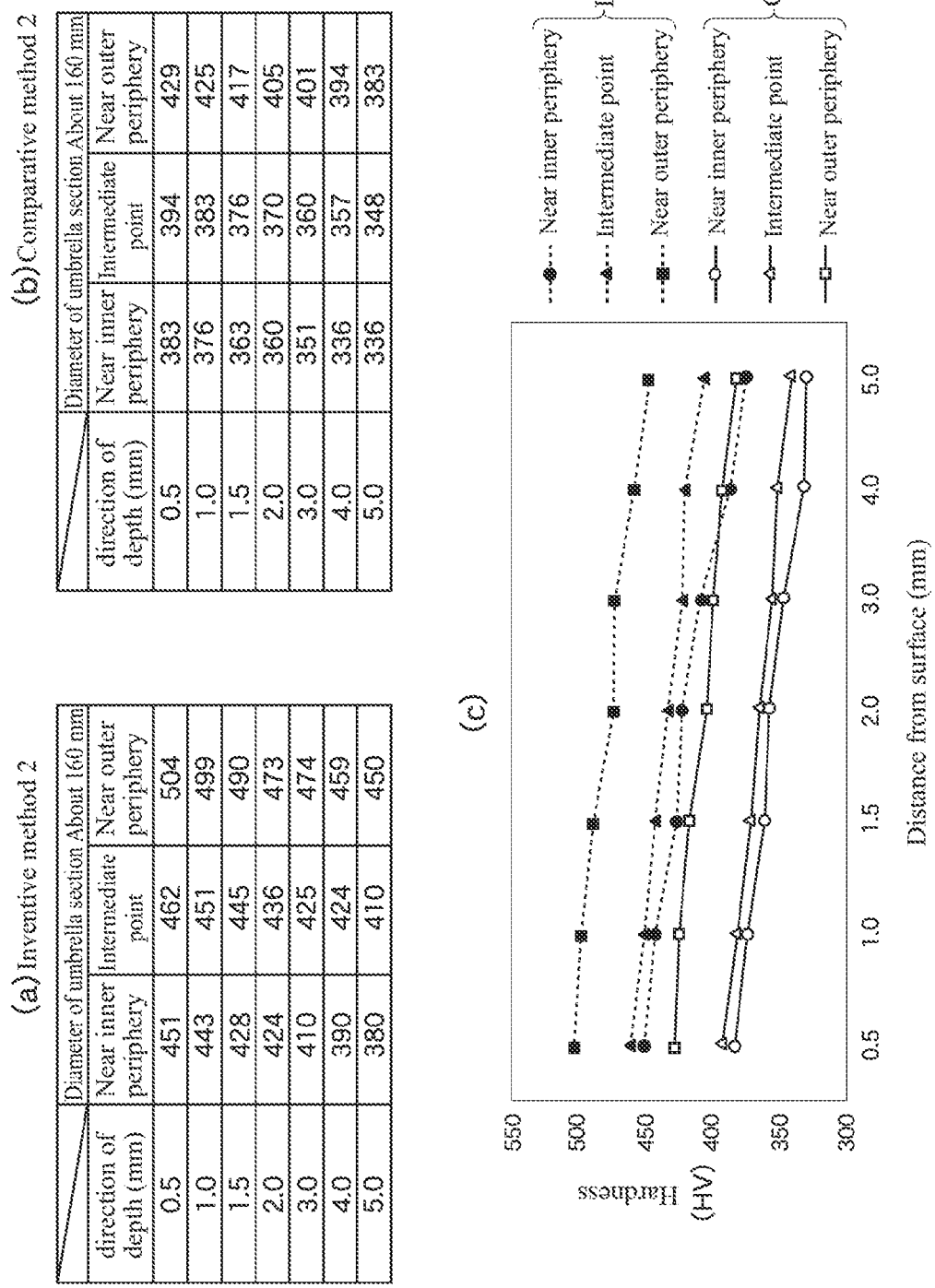
FIG. 11 compares the results of hardness measurements of different valves having a valve head diameter of 160 mm, manufactured by an inventive method 2 and by a comparative method 2. More particularly.

FIGS. 10 compares the hardnesses of valve heads having a diameter of 70 mm manufactured in accordance with a first inventive method 1 and with a comparative method 1. FIG. 11 shows a similar comparison in hardness of valve faces having a diameter of 160 mm, manufactured in accordance with a second inventive method 2 and a second comparative method 2. In this comparison, it should be noted that the inventive methods 1 and 2 differ from the comparative methods 1 and 2 only in that the inventive methods utilize, in the secondary forging, the die unit 40 (die 42). Other features of the forging are the same in the inventive and comparative methods. It should be noted, however, that the comparative methods 1 and 2 also differ from the conventional methods in that the comparative methods 1 and 2 utilize the die unit 20 (the die 22 having a taper forming face 22c1 (both shown in FIG. 4), respectively, in performing the primary forging shown in FIG. 2(b).

Figure 14:
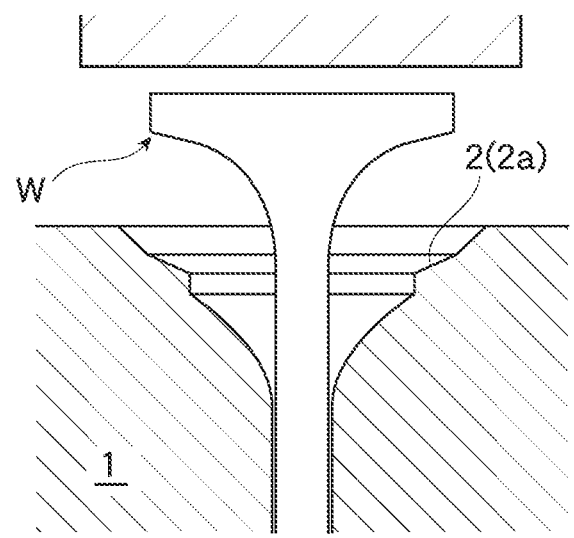
FIG. 14 shows a longitudinal cross section of a conventional die unit for use in secondary forging.

That is, the comparative methods 1 and 2 utilize the same die unit (die 1) as a conventional die unit shown in FIG. 14 (disclosed in the Patent Document 1), in place of the die unit 40 (die 42) for the secondary forging shown in FIG. 2(d). In other words, in the comparative methods the tapered face 16a is forged with the die 1 having the pressing protrusions 43 and the pressing faces 44, respectively, which are both configured to create radial slip deformations in the paripheral tapered face 16a of the valve head of an intermediate valve product W3.

Figure 9:
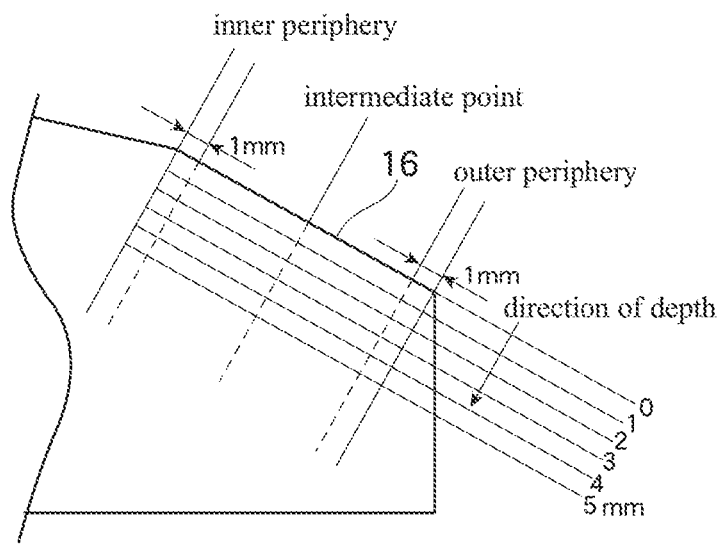
FIG. 9 is a diagram illustrating locations of measuring hardness of the valve face of a valve.

In the hardness tests, Vicker's hardness of the valve head 16 of finished valves are measured at different radial positions including the intermediate point, a point 1 mm radially inward from the outer periphery, and a point 1 mm radially inward from the inner periphery, but at different depths including the depth of 0.5, 1.0, 1.5, 2.0, 3.0, 4.0, and 5.0 mm, as shown in FIG. 9.

It is seen in FIG. 10 that the valves manufactured by the inventive method 1 have Vicker's hardness exceeding 500 HV at many measuring points, including the surface layer as well as deep layers as deep as 4-5 mm. Moreover, quite a few points in the periphery of the valve face requiring very high hardness exhibit Vicker's hardness greater than 550HV. In contrast, it is seen that the valves manufactured by the comparative method 1 have hardnesses less than 500 HV not only in the surface layer but also in the layers at the depth of 4-5 mm.

It is noted that the hardness patterns of the valves manufactured by the inventive method 1 and the comparative method 1 have a common characteristic that hardness is higher in a region closer to the periphery of the valve face than in inner and central regions. However, hardness in any of the peripheral, inner, and central regions of the valve face of a valve forged in the inventive method 1 is higher than the hardness of the valve head forged by the comparative method 1 by about 50-63 HV (that is, the hardness of the valve forged by the comparative method 1 is lower than that of a valve forged by the inventive method 1).

The reason why the hardness of the valves manufactured by the comparative method 1 is smaller than that of valves manufactured by the inventive method 1 may be attributed to the difference in pressure applied to the peripheral tapered face 16a during secondary forging as described above. It will be recalled that a larger pressure is applied to the shallow and deeper layeres of valve material via the pressing protrusions 43 during secondary forging in the inventive method 1 than in the comparative method 1, resulting in a difference of about 50-63 HV.

FIG. 11 compares the results of measurements of hardness of valve faces having a diameter of 160 mm after it is forged by the inventive method 2 and by the comparative method 2.

Steps of the inventive method 2 and the comparative method 2 are substantially the same as the steps used in the foregoing inventive method 1 and comparative method 1, respectively. However, since the diameter of valve heads of the valves tested in this comparison are larger than that tested in the foregoing comparison, so are the bulges formed in the upset forging shown in FIG. 2(a), so that the die unit 20 (die 22 and punch 28) for the primary forging shown in FIG. 2(a) and the die unit 40 (die 42 and punch 48) shown in FIG. 2(d) for the secondary forging shown in FIG. 2(b) are made larger accordingly.

Further, the pressing force of the forging die unit (die 40) is increased such that the force per unit area (that is, the pressing force of the die unit 40 divided by the total area of the pressing protrusions 44) applied to a valve material in secondary forging is the same as that applied by the pressing protrusions 43 in the inventive method 1. However, a valve head having a diameter of 160 mm exhibits a larger deformation resistance than that having a diameter of 70 mm, so that formation of plastic deformations is more difficult, since a thicker valve head has a larger deformation resistance. Consequently, the pressure actually applied to the unit area of the valve material by the pressing protrusions 43 is smaller than that applied in the inventive method 1. (Thus, plastic deformations created in the valve face 16a by the inventive method 2 are smaller than those created by the inventive method 1.) Consequently, in the inventive method 2, plastic deformations will not take place as deeply as in the inventive method 1, so that the hardness (500 to 400 HV) obtained in the former method is smaller than the hardness (about 550 to 500 HV) obtained by the latter method by 50-100 HV. Hardness of the outer periphery of the valve face is in the range from about 500 to 450 HV, which is smaller than the hardness obtained by the inventive method 1 (about 550-500 HV) by about 50 HV. However, it is sufficient for the valve face of a valve.

It is seen in the hardness patterns shown in FIG. 11 that, in the inventive method 2 as well as in the comparative method 2, hardness of the outer peripheral region, central region, and radially inner region of a valve face decreases with the depth in a similar way, and that the corresponding hardness obtained by the inventive method 2 is higher than the hardness obtained by the comparative method 2 by about 54-75 HV on average. It is also seen that hardness of deep layers (lying at the depth in the range from 4.0 to 5.0 mm) in a region close to the inner periphery of the valve face forged by the inventive method 2 is in the range from 500 to 400 HV. On the other hand, hardness of corresponding layers (in the range 4-5.0 mm) forged by the comparative method 2 is less than 350 HV, and hardness of shallower layers in the range from 450 to 350 HV.

Upon comparison of the the hardness patterns of the valve faces of valves manufactured by the inventive method 2 and by the comparison method 2, the valve face hardened by the inventive method 1 has a higher hardness in any of the the outer peripheral, inner peripheral, and central regions than the valve head hardened by the comparative method 1 by about 54-75 HV. This difference may be attrributed to the difference in pressure given to the tapered face 16a of valve face in the secondary forging, as described above.

Figure 12:
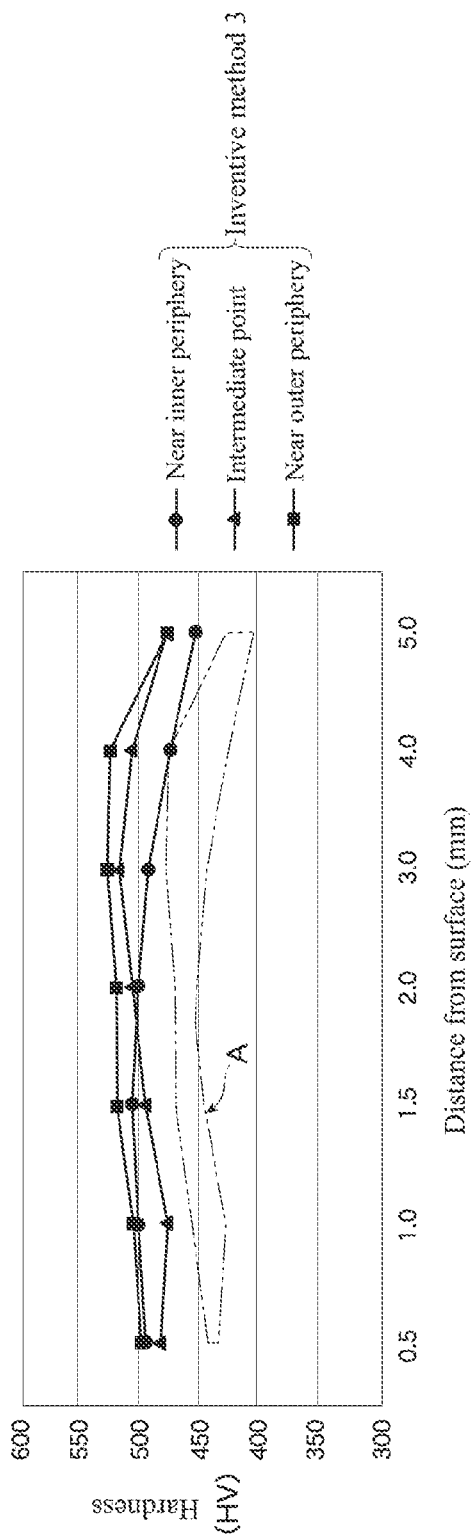
FIG. 12 shows the results of hardness measurements of valves manufactured by an inventive method 3. More particularly.
Figure 13:
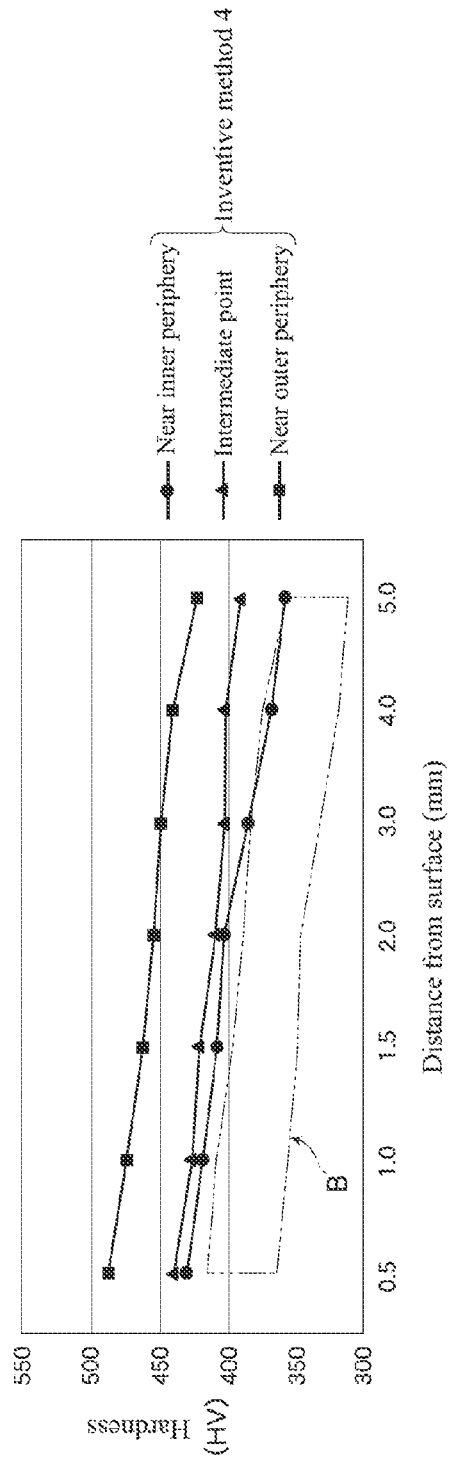
FIG. 13(a) is a table listing the results of the hardness measurements of the valve faces of valves (having a valve head diameter of 160 mm) manufactured by an inventive method 4.
FIG. 13(b) is a graphical representation of the results shown in FIG. 13(a).

FIGS. 12 and 13 show in tabulated form (FIGS. 12(a) and 13(a)) and in graphical form (FIGS. 12(b) and 13(b)) results of hardness tests of valve faces having diameters of 70 mm and 160 mm manufactured by the inventive methods 3 and 4.

The methods 3 and 4 differ from the methods 1 and 2 in that the former methods employ a different primary forging step and a different thickness adjustment step than the primary forging step shown in FIG. 2(b) and the thicknes adjusting step shown in FIG. 2(c). Furthermore, the methods 3 and 4 differ from a conventional method in that these methods include a secondary forging step (FIG. 2(d)) utilizing a metallic die unit 40 (die 42) as shown in FIGS. 5-8, respectively.

In the method 3 (4), a die 20' (die die 22') as shown in FIG. 15 is used in the primary forging in place of the die unit 20 as shown in FIG. 2(b). The die unit 20' (22') has a pressing face 22c' for forming the outer shape of a disk-shape valve head . In other words, the die unit 20 (die 22) used in the method 1 (2) is provided with a pressing face 22c for forming the outer shape of a valve head as shown in FIG. 4(a) and the pressing face 22c is provided with a taper forming face 22c1 for forming the tapered face 16a on the periphery of the valve head. On the other hand, the die 20' (die 22') used in the method 3 (4) is not provided on the pressing face 22c' with a taper forming face 22c1.

Consequently, in order to perform the thickness adjustment in the method 3 (or 4), it is necessary to machine the periphery of the disk-shape intermediate valve product W2 in rotation with tools 30 and 32 as shown in FIG. 17 to form a tapered face 16a on the periphery of the disk-shape valve head.

The valve faces of valves manufactured by the method 3 (or 4) have hardness in the range from 525 to 455 HV (or from 488 to 360 HV), which is lower than the hardness of valves manufactured by the method 1 (or 2) by about 30 HV (20 HV), probably due to the fact that the tapered faces 16a of the intermediate valve products W3 worked in the secondary forging of the method 3 (or 4) are formed by cutting, while the tapered faces 16a of the valves are formed by forging in the method 1 (or 2).

Figure 16:
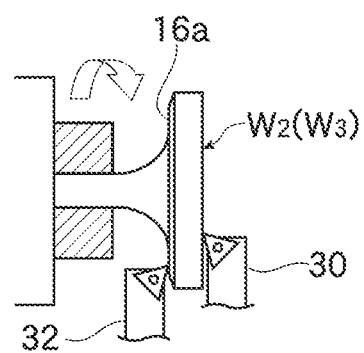
FIG. 16 shows a conventional thickness adjustment step applied to a valve head of a valve.

Thus, it is seen that in the primary forging of the inventive methods 3 and 4 fine grain flow lines are created in the periphery of the disk-shape valve head of the intermediate valve product W2, which enhances the hardness of the periphery of the valve head to some extent. However, in the subsequent thickness adjustment step (FIG. 16), multi-layered grain flow lines running along the surface of the tapered face is cut and less harder inner grain flow lines are exposed on the tapered surface when its rectangular peripheral corner is tapered off. The exposition of the inner grain flow lines remain unchanged (exposed) if the periphery of the valve head (including the tapered face) is subsequently subjected to further secondary forging to promote radial slip deformations in the periphery using the die unit 40. Thus, the hardness of the valve face thus formed is lower by about 30 HV (20HV) than that of the valve face subjected to the primary forging and the secondary forging in accordance with the inventive method 1 (2).

The comparative methods 3 and 4 described above in comparison with the inventive methods 3 and 4, use known die units as shown in FIG. 2(d) in the secondary forging. These die units have a circular pressing protrusion formed in an inner area of the die as shown in FIG. 14. Unlike the inventive methods 3 and 4, these die units 3 and 4 are used to provide the peripheral tapered face 16a with radial slip deformations after the disk-shape valve head is subjected to thickness adjustment.

Hardnesses of the valve faces of valve heads having a diameter of 70 mm (or 160 mm) manufacured by the conventional methods 3 or 4 are not explicitly presented here. However, the valve head subjected to the secondary forging that utilizes a conventional die unit having pressing protrusions 43 (pressing faces 44) continuously allocated along the circumference thereof has a lower hardness by about 50-63 (54-75) HV than that of the valve head subjected to the secondary forging of the inventive method 1 (2) that utilizes the die unit 40 having multiple pressing protrusions 43 (pressing faces 44) spaced apart at equal angular intervals along the circumference, as shown in FIGS. 10 and 11. The hardness of valve faces manufactured by the conventional methods 3 and 4 are estimated to be lower than those manufactured by the inventive methods 3 and 4 about 50-63 HV and 54-75 HV, respectively, as shown by phantom lines A and B in FIGS. 13 and 14, respectively.

In short, the methods 3 and 4 can raise the hardness of a valve face more than the conventional methods 1 and 2 by about 50-63 HV and 54-75 HV, respectively.

Although it is decribed in the inventive methods 1 through 4 that the heat resistive material of a poppet valve 10 is NCF80A, the material may be any other known heat resistive valve materials including precipitation hardened Ni-base alloys such as NCF751.

BRIEF DESCRIPTION OF SYMBOLS 10 poppet valve
11 valve stem
12 valve head
16 valve face
16a tapered face
W1-W5 intermediate valve products
20 die unit for primary forging
22 die
22c pressing face for forming disk-shape valve head
22c1 taper forming face
28 punch
40 die unit for secondary forging
42 die
43 pressing protrusions
44 pressing face
46 grooves
48 punch
50 ejector pin

The invention claimed is:

1. A method of manufacturing a valve for an internal combustion engine, adapted to form a valve face on a periphery of the valve that comes into contact with a valve seat of the internal combustion engine, by creating radial slip deformations in the valve face of an intermediate valve product made of a heat resisting alloy, utilizing a die unit comprising:

a die equipped with pressing protrusions, arranged inside and along a circumference thereof, for forming the valve face, and a punch for pressing a front end of a valve head of the intermediate valve product in the die, the method including utilizing the die unit, wherein the die is provided with a multiplicity of grooves spaced apart from each other at equal angular intervals in a circumferential direction thereof, each groove crossing an associated one of the pressing protrusions; and wherein the intermediate valve product and the die unit are rotated relative to each other, including rotating the die unit relative to the intermediate valve product or rotating the intermediate valve product relative to the die unit, through a predetermined angle in synchronism with the punch in operation.

2. The method according to claim 1,
wherein the intermediate valve product is pushed at one end of a valve stem thereof by an ejector pin so as to retain the valve head of the intermediate valve product off the pressing protrusions of the die when the punch is raised to a predetermined upward position above the die.

3. The method according to claim 1, comprising:
a primary step of forging, in which a generally disk-shape valve head is formed at one end of a rod material, and a predetermined tapered face that corresponds to a valve face of the valve head is formed on the periphery of the disk-shape valve head simultaneously;

a step of adjusting a thickness of the disk-shape valve head by machining an excessively thick portion of the disk-shape valve head; and a secondary step of forging, subsequent to the step of adjusting the thickness, in which the disk-shape valve head is subjected to a secondary forging.

4. The method according to claim 2, comprising:
a primary step of forging, in which a generally disk-shape valve head is formed at one end of a rod material, and a predetermined tapered face that corresponds to a valve face of the valve head is formed on the periphery of the disk-shape valve head simultaneously;

a step of adjusting a thickness of the disk-shape valve head by machining an excessively thick portion of the disk-shape valve head; and a secondary step of forging, subsequent to the step of adjusting the thickness, in which the disk-shape valve head is subjected to a secondary forging.

* * * * *